United States Patent [19]
Yeh et al.

[11] Patent Number: 6,085,331
[45] Date of Patent: Jul. 4, 2000

[54] SETUP OF THE TIME/DATE WITHIN THE CMOS REAL-TIME-CLOCK

[75] Inventors: Kua-Chi Yeh; Li-Hui Chang, both of Taipei, Taiwan

[73] Assignee: Asustek Computer Inc., Taipei, Taiwan

[21] Appl. No.: 09/126,198

[22] Filed: Jul. 30, 1998

[30] Foreign Application Priority Data

Apr. 1, 1998 [TW] Taiwan ................................. 87204813

[51] Int. Cl.$^7$ ....................................................... G06F 1/08
[52] U.S. Cl. ............................................................ 713/400
[58] Field of Search .................................. 713/500, 400, 713/401, 600; 379/67; 709/400

[56] References Cited

U.S. PATENT DOCUMENTS

| | | | |
|---|---|---|---|
| 4,473,889 | 9/1984 | Ross .......................................... | 364/900 |
| 4,575,848 | 3/1986 | Moore et al. .............................. | 371/61 |
| 5,214,760 | 5/1993 | Hammond et al. ...................... | 395/250 |
| 5,535,261 | 7/1996 | Brown et al. .............................. | 379/67 |
| 5,572,716 | 11/1996 | Meisner ................................... | 395/555 |
| 5,978,925 | 11/1999 | Shiraishi et al. ........................ | 713/400 |

*Primary Examiner*—Joseph E. Palys
*Assistant Examiner*—Omar A. Omar
*Attorney, Agent, or Firm*—Fulbright & Jaworski LLP

[57] ABSTRACT

An apparatus for setting up a time/date of a CMOS real-time-clock within a computer system is disclosed. The computer system includes a processor, a memory, an I/O controller and a first parallel port interface. The apparatus uses the first parallel port within the system to set up the CMOS real-time-clock. The apparatus includes a reference real-time-clock for storing a reference date/time, a second parallel port interface connected to the first parallel port interface. The second parallel port interface is connected to the reference real-time-clock through a signal line. The computer system, responsive to a set-up instruction, reads the reference date/time from the reference real-time-clock and writes the reference date/time, via the I/O controller, into the CMOS real-time-clock of the computer system.

1 Claim, 3 Drawing Sheets

```
25-PIN PARALLEL PORT
PIN  1=VCC(0)         PIN 14=DS(0)
PIN  2=SPD0           PIN 15=error#(1)
PIN  3=SPD1           PIN 16=INIT#(0)
PIN  4=SPD2           PIN 17=SLIN#(0)
PIN  5=SPD3           PIN 18=GND
PIN  6=SPD4           PIN 19=GND
PIN  7=SPD5           PIN 20=GND
PIN  8=SPD6           PIN 21=GND
PIN  9=SPD7           PIN 22=GND
PIN 10=ACK#(1)        PIN 23=GND
PIN 11=BUSY(1)        PIN 24=PNF
PIN 12=PE(1)          PIN 25=GND
PIN 13=SLCT(1)
```

FIG. 2

```
                          DS-12887
GND(pin 16)--------MOT  1     24   VCC ------ VCC(pin 1)
                    NC  2     23   SQW
                    NC  3     22   NC
SPD0(pin 2)--------AD0  4     21   RCLR# ---- VCC(pin 1)
SPD1(pin 3)--------AD1  5     20   NC
SPD2(pin 4)--------AD2  6     19   IRQ#
SPD3(pin 5)--------AD3  7     18   RESET# --- VCC(pin 1)
SPD4(pin 6)--------AD4  8     17   DS ------- DS(pin 14)
SPD5(pin 7)--------AD5  9     16   NC
SPD6(pin 8)--------AD6 10     15   R/W# ---- R/W#(pin 16)
SPD7(pin 9)--------AD7 11     14   AS ------- AS(pin 17)
GND(ptn 18)--------GND 12     13   CS# ----- GND(pin 18)
```

FIG. 3

FIG. 4
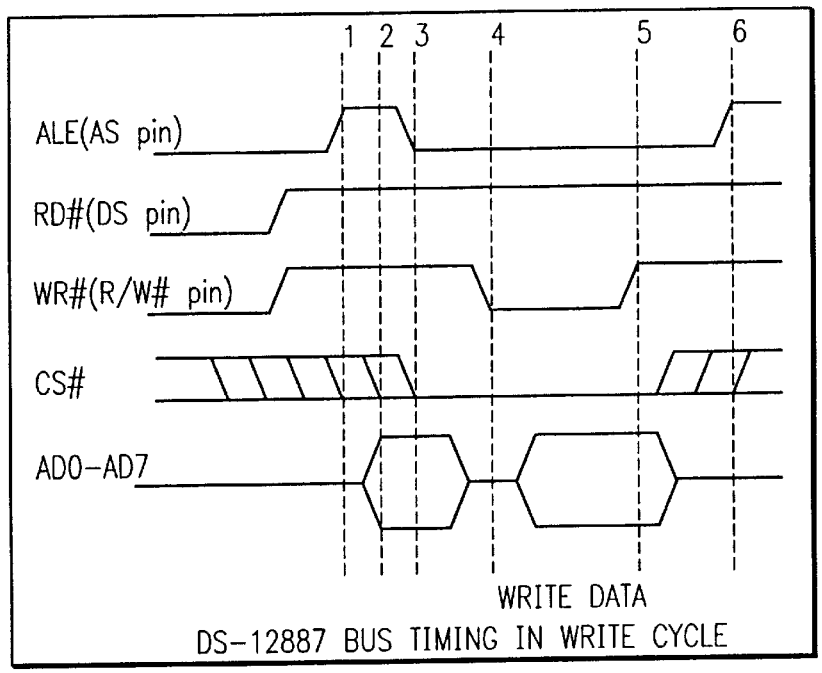
DS-12887 BUS TIMING IN WRITE CYCLE
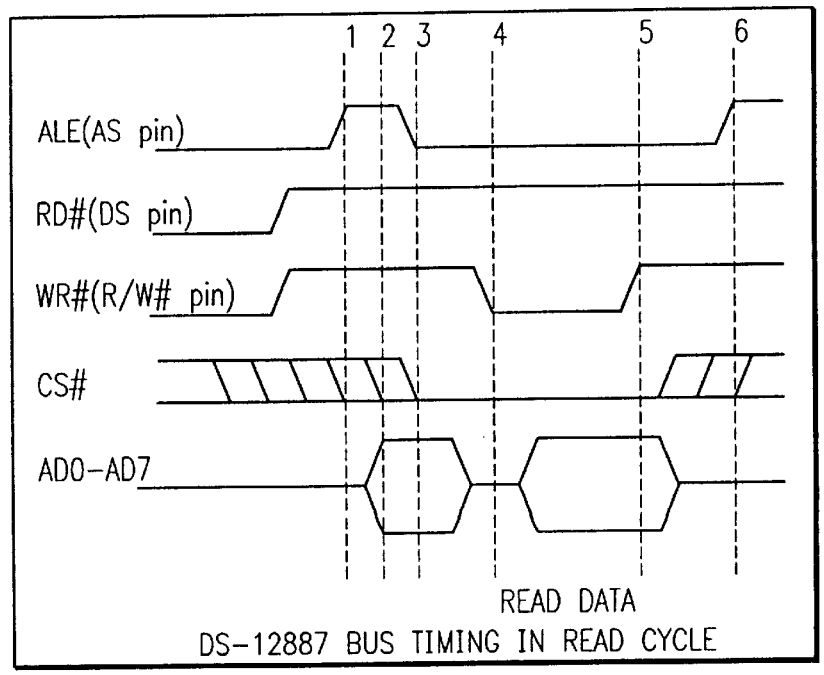
DS-12887 BUS TIMING IN READ CYCLE
FIG. 5

SETUP OF THE TIME/DATE WITHIN THE CMOS REAL-TIME-CLOCK

FIELD OF INVENTION

The invention relates to an apparatus for setting up the time/date of CMOS real-time-clock of a computer system.

BACKGROUND OF INVENTION

It is well known, during the final assembly stage of a computer system or a main board of a computer system, the time/date of the CMOS real-time-clock within the system or main board must be set up to an accurate time/date data. To perform the objective, conventionally, a debug card is connected to the system through one of the ISA slots of the system. The debug card has a reference real-time-clock with accurate time/date data. This reference real-time-clock on the debug card is used to set up the time/date of the CMOS real-time-clock on the system. In typical, the debug card occupies the address D000 within the address space.

Due to expansion need of Basic Input/Output System (BIOS), it is inevitable that address D000 will be used by the BIOS in the future. If the BIOS really occupies address D000 in the future, the conventional approach used nowadays will not work any more.

SUMMARY OF THE INVENTION

To the mentioned issue above, the invention provides an apparatus which employs the parallel port of the computer system to set up the time/date of the CMOS real-time-clock of the system.

An apparatus for setting up a time/date of a CMOS real-time-clock within a computer system is provided. The computer system includes a processor, a memory, an I/O controller and a first parallel port interface. The apparatus uses the first parallel port within the system to set up the CMOS real-time-clock. The apparatus includes a reference real-time-clock for storing a reference date/time, a second parallel port interface connected to the first parallel port interface. The second parallel port interface is connected to the reference real-time-clock through a signal line. The computer system, responsive to a set-up instruction, reads the reference date/time from the reference real-time-clock and writes the reference date/time, via the I/O controller, into the CMOS real-time-clock of the computer system.

BRIEF DESCRIPTION OF THE DRAWINGS

FIG. 2 shows the pin definition of the standard parallel port interface.

FIG. 3 shows the pin definition of the DS-12877 chip made by DALLAS.

FIG. 4 shows the data write timing of DS-12877.

FIG. 5 shows the data read timing of DS-12877.

DETAILED DESCRIPTION OF THE EMBODIMENT

Figure 1:
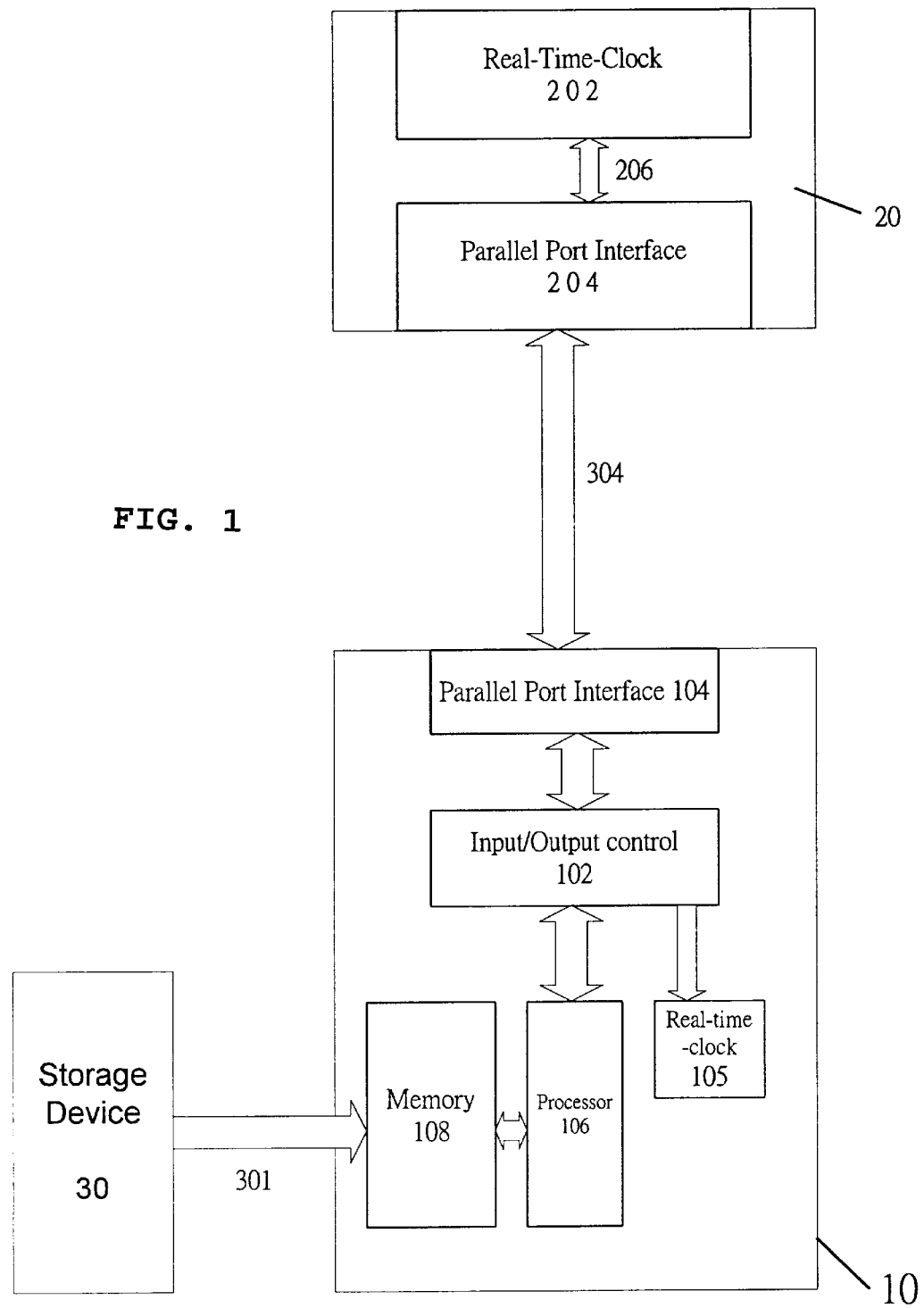
FIG. 1 shows the functional blocks of the invention.

As shown in FIG. 1, as an embodiment, the software program, or utility, that directs the executions of the invention, is stored within the external storage device 30. As conventionally, during the initial setup period, the software program is loaded into the memory 108 of the computer system 10 for execution. In details, the invention employs the computer system 10, the external storage device 30, and the setup apparatus 20 to setup the time/data of CMOS real-time-clock 105 by the accurate time/data of real-time-clock 202.

As well known in the arts, the computer system 10 includes a processor 106, a memory device 108, an Input/Output controller 102, a real-time-clock 105 and a parallel port interface 104. An external storage device 30 communicates with the memory device 108 via the signal lines 301. The internal operations within the computer system 10 fall within domain of the prior arts and will not recited herein.

The setup apparatus 20 includes a real-time-clock 202 and a parallel port interface 204 that is connected to the real-time-clock 202 via the signal line 206. The date/time value stored in the real-time-clock 202 has been calibrated as a correct value. The invention executes the setup program stored in the external storage device 30. The setup program reads the correct time/date of the real-time-clock 202 and writes, via the input/output controller 102, the value into the real-time-clock 105. Before the setup program in executed, the interface 204 of the setup apparatus 20 is connected to the interface 104 via a connector or signal lines. In a preferred embodiment, the interface 204 is a male connector having 25 pins of standard parallel port, and the interface 104 is a female connector having 25 pins of standard parallel port. The detailed pins definition is disclosed in FIG. 2.

In a preferred embodiment, the real-time-clock 202 is a DS-12877 chip made by Dallas Semiconductor Co. The detailed pins definition is disclosed in FIG. 3. And the functions of each pins of DS-12877 may be obtained from the Technical Manual published by the Dallas Semiconductor Co. Furthermore, FIG. 3 also shows the connection relationship between the 25 pins of the parallel port and corresponding pin of DS-12877. In FIG. 3, pins without connection indication are don't care pins.

The data write timing of DS-12877 is shown in FIG. 4 and the data read timing of DS-12877 is shown in FIG. 5. The software program provided by the invention instructs the input/output controller 102 within the computer system 10 to issue the timing shown in FIG. 5, via the parallel port interface 104, in order to read out the date/time within the real-time-clock 202 within the setup apparatus 20. In succession, the invention write the value of date/time obtained into the real-time-clock 105 within the computer system 10 according to the timing prescribed by FIG. 4.

The DS-12887 is used, illustratively, in the above to facilitate the explanation of the invention. It is well known that there are other real-time-clock chips may substitute the DS-12887. When using other equivalent chips to embody the invention, the pin definition will not be exactly same as that shown in FIG. 3. Accordingly, the data read/write timings will not be exactly same as that shown in FIG. 4 and FIG. 5 respectively. It is obvious to persons skilled in the arts, when a corresponding modification is implemented, using different real-time-clocks may still achieve the objective of the invention without departing the spirit of the invention.

What is claimed is:

1. An apparatus for setting up a time/date of a CMOS real-time-clock within a computer system that comprises a processor, a memory, an I/O controller and a first parallel port interface, comprising:

a reference real-time-clock storing a reference date/time;

a second parallel port interface connected to the first parallel port interface, the second parallel port interface being connected to the reference real-time-clock through a signal line;

wherein, the computer system, responsive to a set-up instruction, reads the reference date/time from the reference real-time-clock and writes the reference date/time, via the I/O controller, into the CMOS real-time-clock of the computer system.

* * * * *